US006445389B1

(12) United States Patent
Bossen et al.

(10) Patent No.: US 6,445,389 B1
(45) Date of Patent: Sep. 3, 2002

(54) COMPRESSION OF POLYGONAL MODELS WITH LOW LATENCY DECOMPRESSION

(75) Inventors: Frank J. Bossen, Plan-les-Ouates (CH); Andre P. Gueziec, Sunnyvale, CA (US); Claudio T. Silva, Mahwah, NJ (US); Gabriel Taubin, Hartsdale, NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/411,448

(22) Filed: Oct. 1, 1999

Related U.S. Application Data
(60) Provisional application No. 60/103,257, filed on Oct. 6, 1998.

(51) Int. Cl.[7] ................................. G06T 17/00
(52) U.S. Cl. ........................................ 345/420
(58) Field of Search ................. 345/418, 419, 345/420, 421, 422

(56) References Cited

U.S. PATENT DOCUMENTS 5,825,369 A  * 10/1998  Rossignac et al. ........... 345/440
5,905,507 A  *  5/1999  Rossignac et al. ........... 345/440

\* cited by examiner

*Primary Examiner*—Cliff N. Vo
(74) *Attorney, Agent, or Firm*—Louis J. Percello; Fitch, Even, Tabin & Flannery

(57) ABSTRACT

A data structure for representing a general n-dimensional polygonal mesh. The data structure includes a structure record and a data record for each three dimensional shape. The structural record contains polygonal model connectivity information and further includes a stitching record that defines corresponding polygonal (triangular) mesh edge pairs and a polygonal (triangular) tree record representing a polygon (triangle) tree. The stitching record includes a vertex tree and a set of jump edges. The data record includes at least three polygonal records, each corresponding to a polygon. Each polygonal record is associated with a face of said polygonal model and classifies its corresponding polygon as either a leaf polygon, a running polygon or a branching polygon. Polygonal shapes are encoded into the data structure by first building a spanning tree for the polygonal mesh. A set of cut edges are derived for the polygonal mesh. The stitching record is constructed for the set of cut edges. Then traversing the polygon tree, the data records are encoded. The encoded data is transmitted, the structure record being transmitted first, followed by the data record. The stitching tree and polygon tree are decoded as they are received and, after at least three polygons are received, received polygons may be displayed.

19 Claims, 6 Drawing Sheets

COMPRESSION OF POLYGONAL MODELS WITH LOW LATENCY DECOMPRESSION

RELATED APPLICATIONS

This application claims priority from provisional application No. 60/103,257, filed Oct. 6, 1998.

The present invention is related to application Ser. No. 08/688,572 filed Jul. 30, 1996, entitled "Compression of Simple Geometric Models Using Spanning Trees", to J. Rossignac and G. Taubin, now issued as U.S. Pat. No. 5,825,369 and application Ser. No. 08/685,422 filed Jul. 30, 1996, entitled "Compression of Geometric Models Using Spanning Trees", to J. Rossignac and G. Taubin, now issued as U.S. Pat. No. 5,905,507, both assigned to the assignee of the present invention and incorporated herein by reference in their entirety.

FIELD OF THE INVENTION

This invention relates to the field of computer graphics. More specifically, the invention relates to the representation of polygonal models in compressed form suitable for rendering with low latency.

BACKGROUND OF THE INVENTION

Although the geometric modeling domain is being expanded for mechanical computer aided design (CAD) and for animation modeling systems to include free form surfaces, polygonal models remain the primary three dimensional (3D) representation used in the manufacturing, architectural, geographic information systems, geoscience, and entertainment industries. In particular polygonal models are effective for hardware assisted rendering, which is important for video-games, virtual reality, fly-through, and electronic mockup applications involving complex Computer Aided Design models.

Furthermore, 3D models are being used as a video compression mechanism for teleconferencing and future video coding standards, e.g., motion picture experts group four (MPEG-4), which is to be used in the next generation of cellular phones and for home entertainment systems (set-top boxes).

A polygonal model may be defined by what is referred to as the model's geometry. A typical definition includes the position of its vertices which are n-dimensional vectors; what is referred to as the model's connectivity, i.e., the association between each face and its sustaining vertices; and/or, by what is referred to as the model's properties. A model's properties may include its colors, normals, and texture coordinates that do not affect the 3D geometry of the model, but that influence the way it is shaded during rendering.

Methods for efficiently representing single-resolution polygonal models in compressed form are known in the prior art. Such methods are known in the art for easily and efficiently triangulating arbitrary polygonal faces. Many of these methods only consider polygonal models that have been defined by triangular meshes. A triangular mesh is a polygonal model in which all model faces are represented as triangles. Graphs and trees for managing these triangular meshes are generally described by R. E. Tarjan in "Data Structures and Network Algorithms," SIAM, 1983, which is incorporated herein by reference.

New compression methods and systems for compressing polygonal models are described in detail in U.S. Pat. No. 5,825,369 entitled "Compression of Simple Geometric Models Using Spanning Trees", to J. Rossignac and G. Taubin, and in U.S. Pat. No. 5,905,507 entitled "Compression of Geometric Models Using Spanning Trees", to J. Rossignac and G. Taubin, both assigned to the assignee of the present invention, incorporated herein by reference in their entirety and collectively referred to hereinafter as Rossignac et al.

Briefly, as described in Rossignac et al., the connectivity of the triangular mesh is preserved, effectively, without loss of information. The vertices of the triangular mesh are organized into a tree referred to as a "vertex spanning tree" and the triangles of the mesh are organized into a tree referred to as a "triangle spanning tree." A graph referred to as the graph of the triangular mesh is defined by the vertices and edges of the triangular mesh and includes the vertex spanning tree as a sub-graph. A graph referred to as the dual graph of the triangular mesh is defined by the triangles and edges of the triangular mesh and includes the triangle spanning tree as a sub-graph. What is referred to as the order for the edges of the triangular mesh defines the traversal order of both the vertex spanning tree and the triangle spanning tree. Each shape is represented as a simple polygon formed from triangles, the vertex positions and properties are quantized and what is known as entropy is encoded.

FIG. 1 shows a prior art decoder process 1000, which receives a compressed geometric data stream 1100 as an input and produces an uncompressed geometric data stream 1200 as an output. The percentage of the compressed data stream 1100 that must be received before the decoder 1000 starts producing output is known as decoder latency. In many instances, the decoder 1000 may not be capable of producing an output before receiving the entire compressed data stream 1100 input. If the decoder 1000 must receive the entire bitstream before producing any triangles, it has 100% decoder latency. Ideally, decoder latency is zero and, as the decoder 1000 receives the compressed data input 1100, simultaneously, it produces an uncompressed output 1200.

FIG. 2 is a plot 2000 illustrating decoder latency 2100. The plot 2000 shows the percentage of uncompressed data stream 2300 as a function of the percentage of the compressed data stream 2200. Decoder latency 2100 is the x-axis intercept. Rossignac et al. achieves very good compression efficiency, but at a cost of 100% decoder latency.

Thus, there is a need for a polygon model compression/decompression technique for the transmission of geometry with low latency without added redundancy.

SUMMARY OF THE INVENTION

It is therefore a purpose of the present invention to improve geometry compression without added redundancy and with low latency;

It is yet another purpose of the invention to improve compressing, storing, transmitting, decompressing polygonal models;

It is another purpose of the present invention to render polygon models directly from a compressed bitstream without requiring an extra decoding step.

The present invention is a method for modifying and reordering a data bitstream of a geometric model without adding redundancy and with low latency. The bitstream is divided into three parts, two parts much smaller than the third and which are the first part of the datastream. The first two parts are a stitching record defining external edge pairs and a triangle tree record which is a representation of the triangle tree of a simple polygonal model. The third, larger part which includes data records for triangles in the triangle tree. The data records can be received incrementally, and as they are received, triangles are output for display.

DETAILED DESCRIPTION OF A PREFERRED EMBODIMENT OF THE INVENTION

Figure 3:
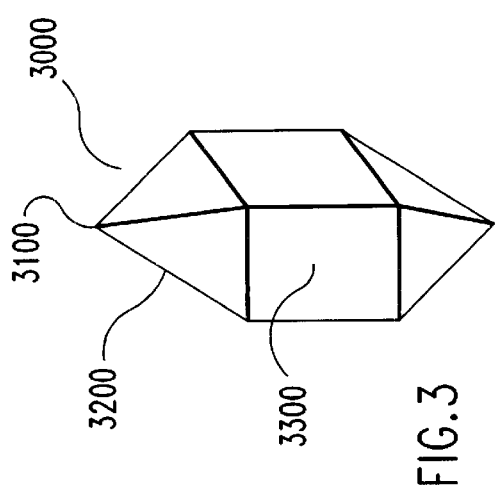
FIG. 3 is an example of a polygonal shape.

FIG. 3 shows a polygon shape 3000 that may be represented as a polygonal model. Each polygonal model 3000 includes vertices 3100, edges 3200, and faces 3300. Polygon models are described, generally, by Foley et al. in "Computer Graphics: Principles and Practice," Addison-Wesley, 1990, which is here incorporated by reference.

Typically, a polygonal model represents the polygon shape 3000 with a vertex positions array representing V vertices 3100 of the polygonal shape 3000 and a face array representing the shape's F faces 3300. The position of each vertex 3100 of the polygonal shape 3000 is represented in the vertex positions array by N floating point coordinates. A vertex index points to locations of vertices 3100 in the vertex positions array. A "face index" that is included for each vertex 3100, designates the location for each polygon face 3300 of "a face number of vertices" in the face array. The face number of vertices and one or more "face vertex indices" define a polygonal or triangular mesh for the corresponding polygon face 3300. As described in detail in Rossignac et al., the shape may be cut along selected edges 3200 and the exterior surface flattened like an orange peel to form a simple polygon.

Figure 1:
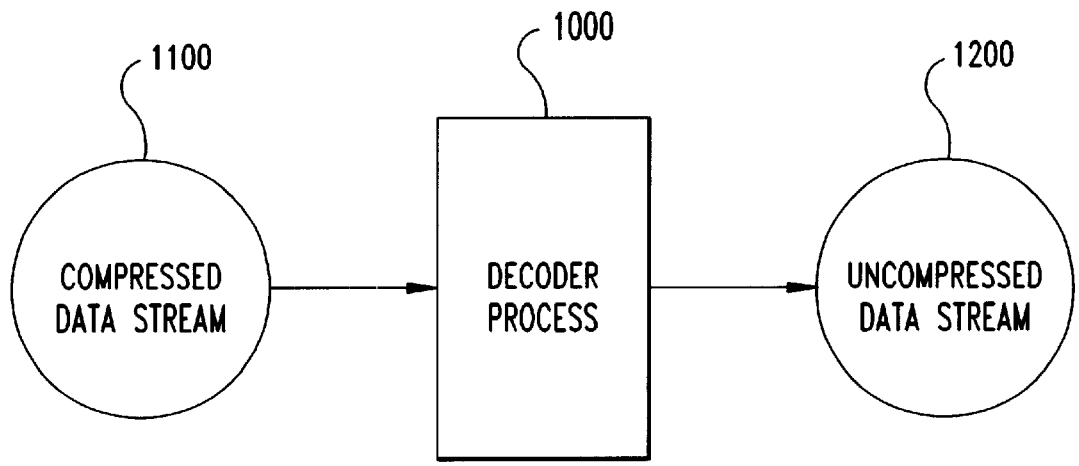
FIG. 1 is prior art of a decoder process.
Figure 2:
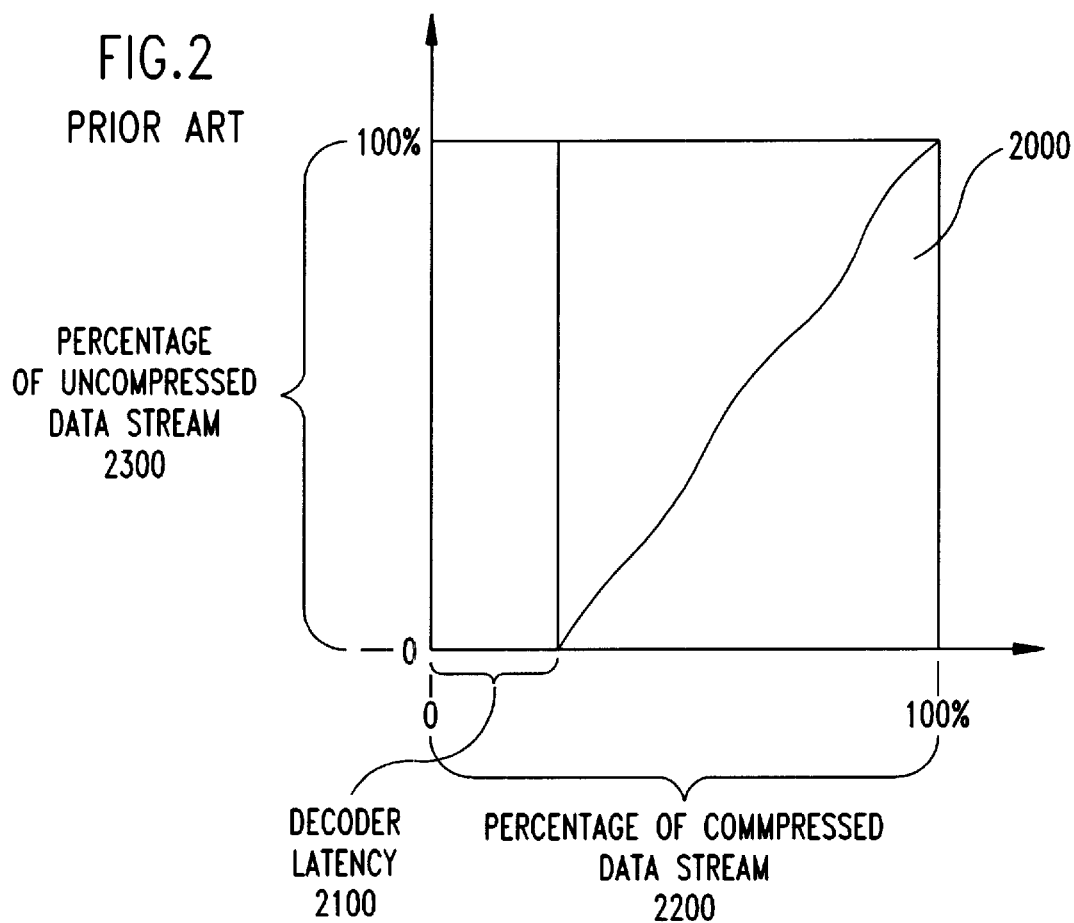
FIG. 2 is a diagram illustrating the decoder latency.
Figure 4A:
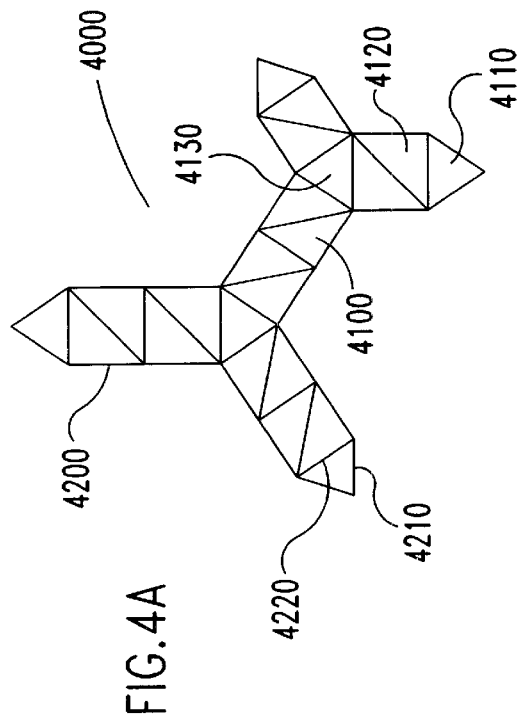
FIGS. 4A–B is a diagram of the polygonal shape of FIG. 3 reduced to a triangular mesh.

FIG. 4A is a diagram of a simple polygon 4000, which is a triangular mesh of one or more triangles 4100, derived from a polygon shape 3000. Each connected component of the polygonal model is represented as a simple polygon 4000 and a vertex spanning graph. Further, each simple polygon 4000 may be represented by a triangle tree and a marching pattern. The vertex spanning graph contains a vertex spanning tree and a set of jump edges. The triangular mesh includes three distinguishable types of triangles 4100: a leaf triangle 4110 which is a triangle that is connected only to a single adjacent triangle 4120; a running triangle 4120 which is a triangle that is connected between two other triangles; and, a branching triangle 4130 which is connected between three other triangles. The three edges 4200 of each triangle 4100 are distinguishable as one of two types of edges: an external edge 4210 of a single triangle 4100; and, an internal edge 4220 shared by two triangles 4100.

Figure 4B:
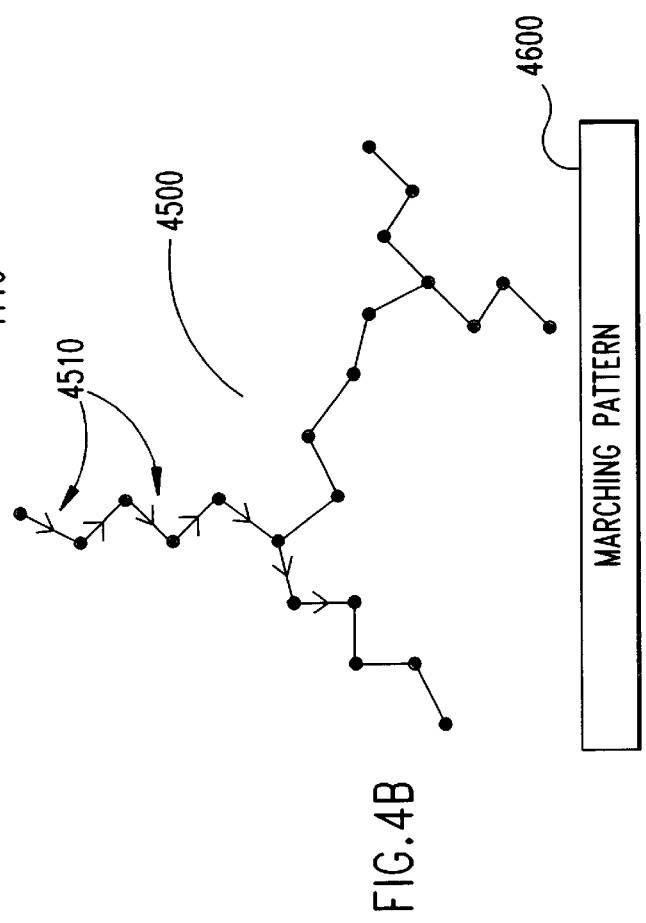

FIG. 4B is a corresponding triangle tree 4500 for the triangular mesh of FIG. 4A and a marching pattern 4600. The triangle tree includes a triangle traversal order 4510 that defines the order of traversal of the triangles of the simple polygon 4000 of FIG. 4A.

Figure 5:
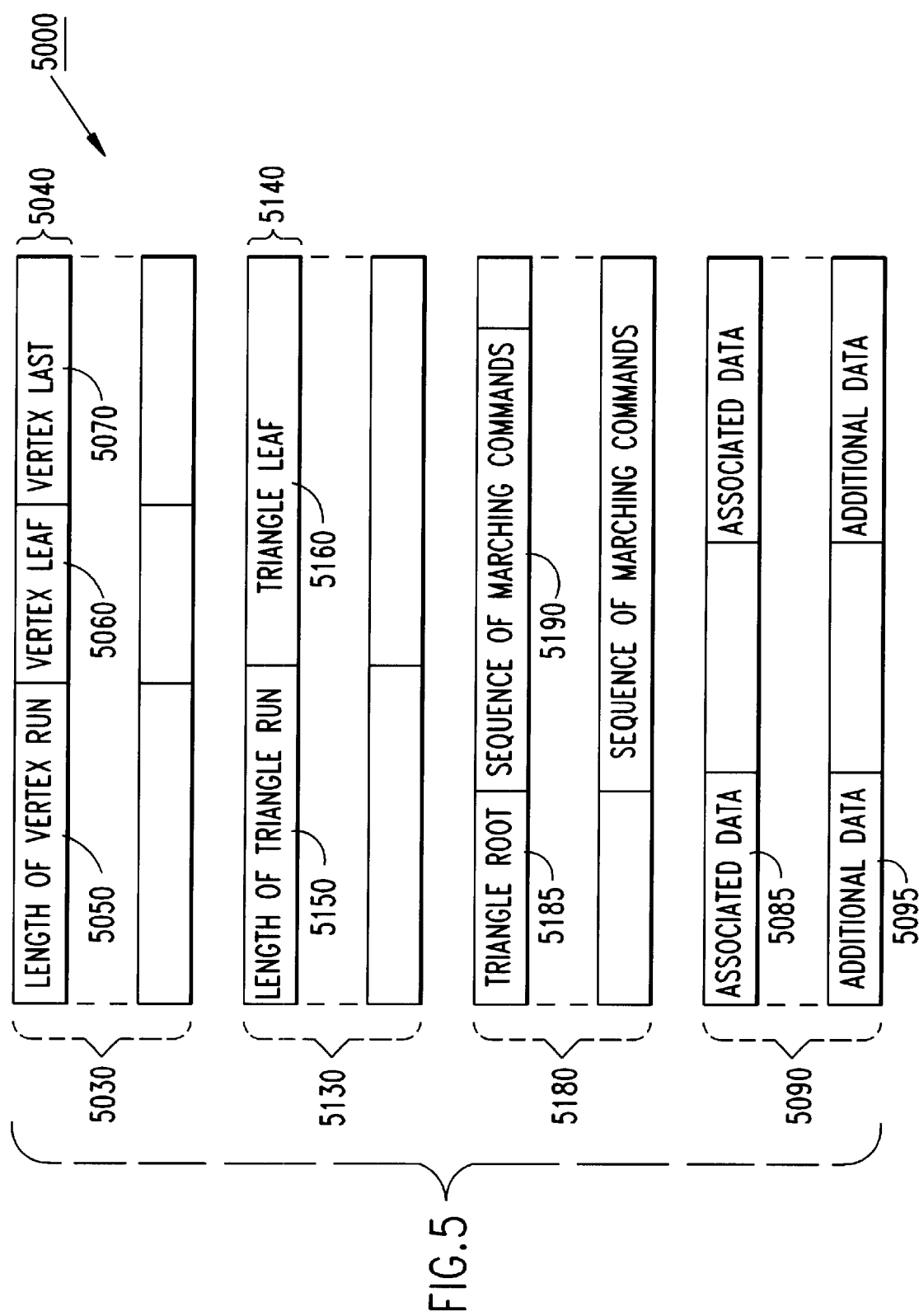
FIG. 5 shows the topological-surgery compression technique of Rossignac et al.

FIG. 5 is a block diagram of the data structure 5000 for representing a simple triangular mesh 4000 in n-dimensional space according to Rossignac et al. This data structure 5000, which as noted above each simple triangular mesh 4000 requires 100% latency, includes:

1) A vertex spanning tree described by a table of vertex runs 5030, the table of vertex runs having one or more vertex run records 5040, each vertex run record having a length of vertex run field 5050, a vertex leaf field 5060, and a vertex last field 5070.

2) A triangle spanning tree described by a table of triangle runs 5130, the table of triangle runs having one or more triangle run records 5140, each triangle run record having a length of triangle run field 5150 and a triangle leaf field 5160.

3) A marching record 5180 having a triangle root field 5185 and one or more sequences of marching commands 5190, the triangle root field 5185 describing how to construct the triangle associated with a triangle root node of the triangle spanning tree, and each sequence of marching commands 5190 indicating the marching pattern, i.e., how to construct triangles from one of the triangle runs by advancing to a next vertex along either: A. a left run boundary or, B. a right run boundary of the triangle run.

4) An (optional) associated data records 5080 having one or more associated data fields 5085, each associated data field with information about the position of one vertex of the simple triangular mesh.

5) One or more (optional) additional data records 5090, each additional data record 5090 having one or more additional data fields 5095, each additional data field with information about one color, normal or texture coordinates vector of the simple triangular mesh.

Figure 6:
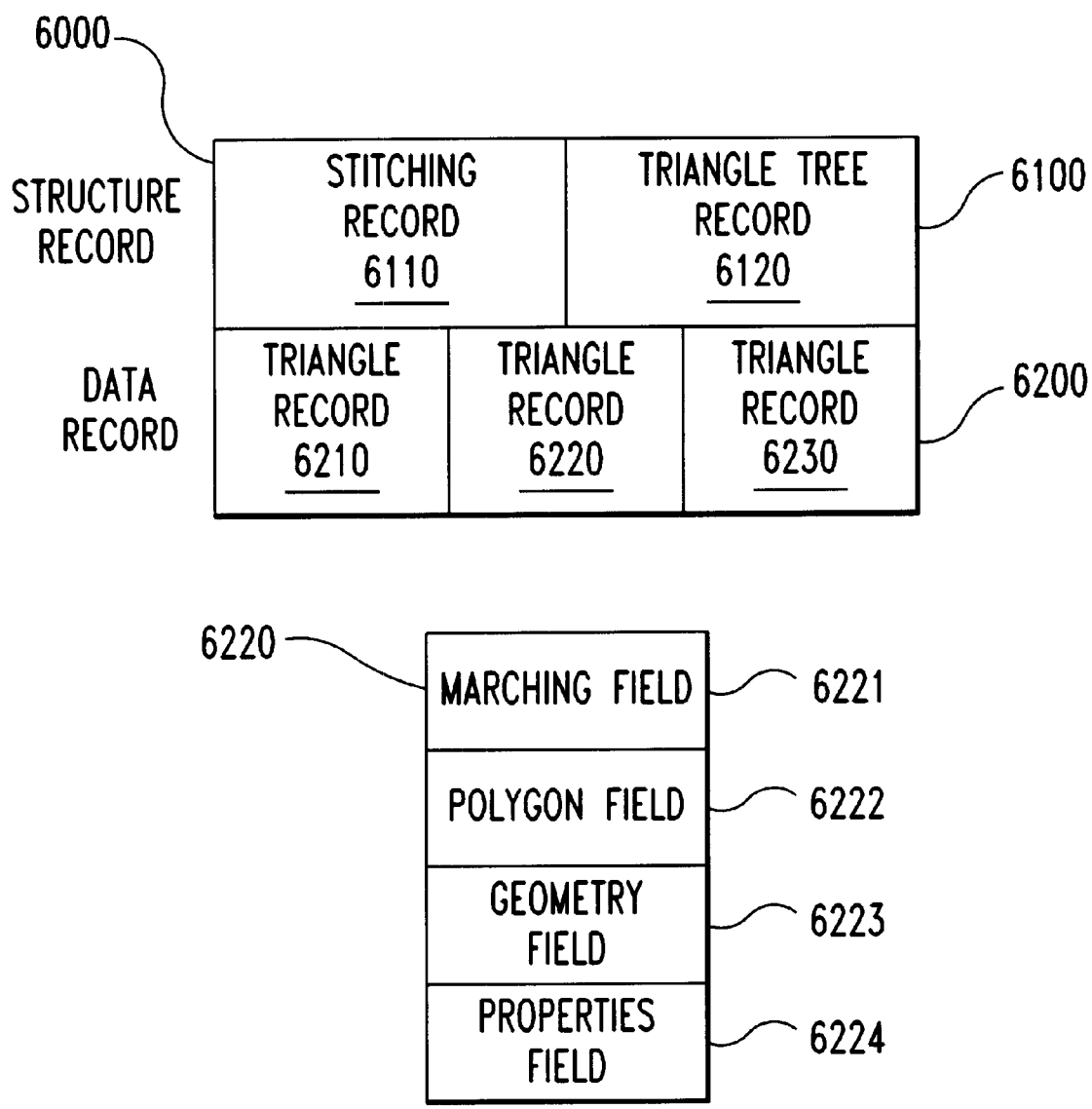
FIG. 6 is a block diagram of a preferred embodiment data structure for representing polygonal models.

The inventors have discovered that by encoding polygonal models according to the preferred polygonal model data structure 6000 of FIG. 6, latency may be reduced from 100% for the data structure 5000 of FIG. 5 to as low as 20%. The preferred polygonal model data structure includes a structure record 6100 and a data record 6200. Either or both of the structure record 6100 and the data record 6200 may be compressed using run-length coding, Huffman coding, Arithmetic coding, Shannon-Fano-Elias coding or Lempel-Ziv coding.

The structure record 6100 contains connectivity information about the polygonal model including the organization of triangles as a rooted triangle tree. Optionally, the polygon model may include polygons as well as or instead of triangles. The rooted triangle tree defines the traversal order 4510 of the triangles in a simple polygon 4000 starting from a root triangle. The structure record 6100 also includes a stitching record 6110 and a triangle tree record 6120. The stitching record 6110 defines any and all (0, 1 or more) pairs of external edges 6140 that correspond to the same model edge. Preferably, the stitching record 6110 includes a vertex tree and a set of jump edges, as described in Rossignac et al. The triangle tree record 6120 is a representation of the triangle tree.

Each data record 6200 includes one or more triangle records 6210, 6220, 6230. Each triangle record corresponds to one of triangles 4110, 4120, 4130, which are ordered according to the traversal order 4510. Each triangle of the triangle tree is associated with a face of the polygonal model. The triangles of the triangle tree are classified into leaf triangles 4110, running triangles 4120, and branching triangles 4130.

Each triangle record 6220 may include an optional "marching field" 6221, an optional "polygon field" 6222, an optional "geometry field" 6223 and, an optional "properties field" 6224. The marching field 6221 is omitted for any triangle that is a branching triangle 4130 or a leaf triangle 4110. For identifying included optional elemental polygons wherein one or more faces 3300 are other than triangles, an optional polygon bit in polygon field 6222 may be included. The geometry field 6223 is omitted for any triangle wherein all the geometry is known. The properties field 6224 may be included to represent properties such as color, normals and texture coordinates attached to the triangle.

Figure 7:
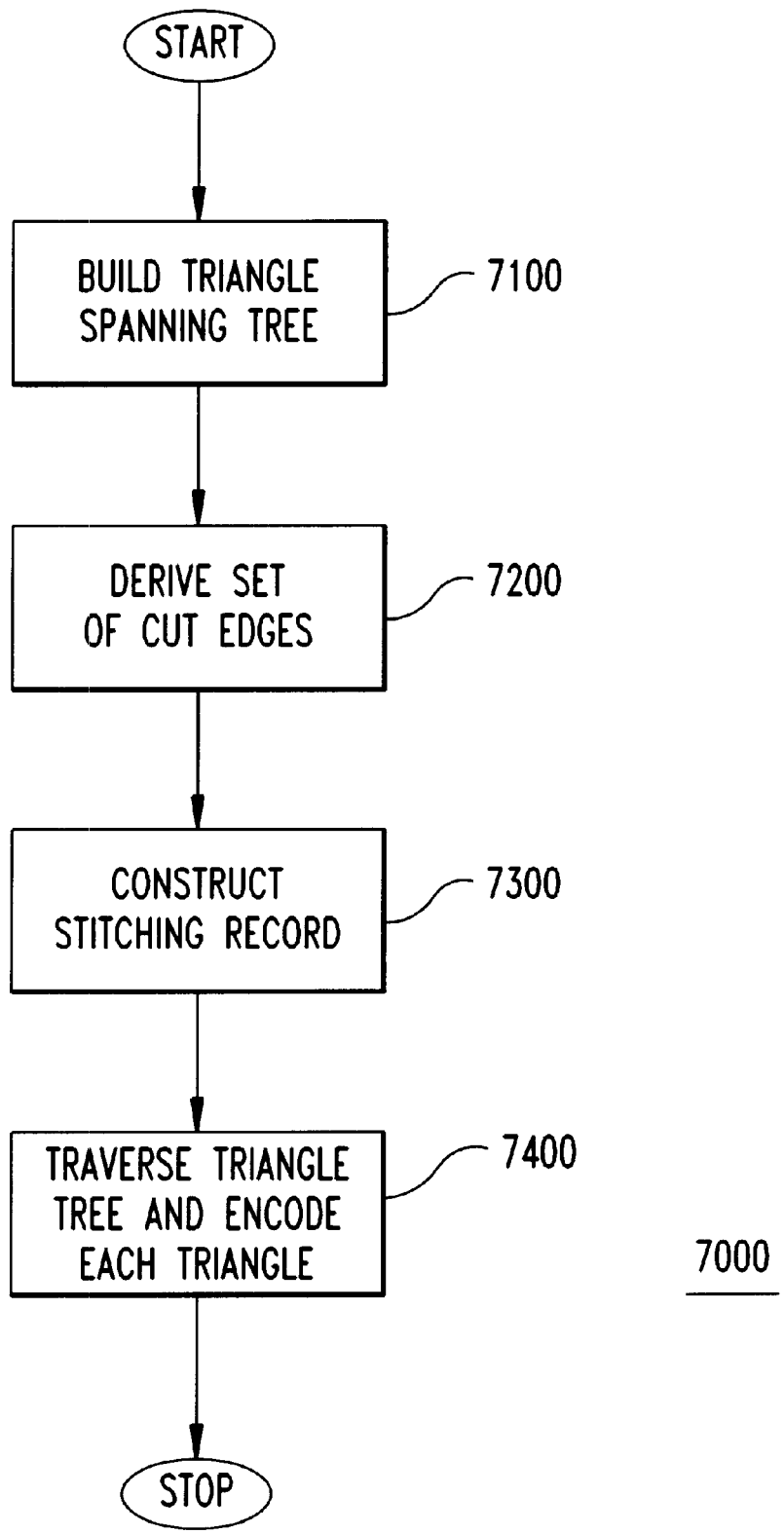
FIG. 7 is a flow chart of a method for compressing a polygonal model using the data structure of FIG. 6.

FIG. 7 is a flow chart for compressing a polygonal model into a data structure 6000 according to the preferred embodiment method 7000 of the present invention. First in step 7100, a triangle spanning tree is built in the dual graph of the triangular mesh for the polygonal model. Then, in step 7200 a set of cut edges is derived. In step 7300 the stitching record is constructed. Finally, in step 7400 the triangle spanning tree is traversed and triangle data is encoded for each traversed triangle.

Figure 8:
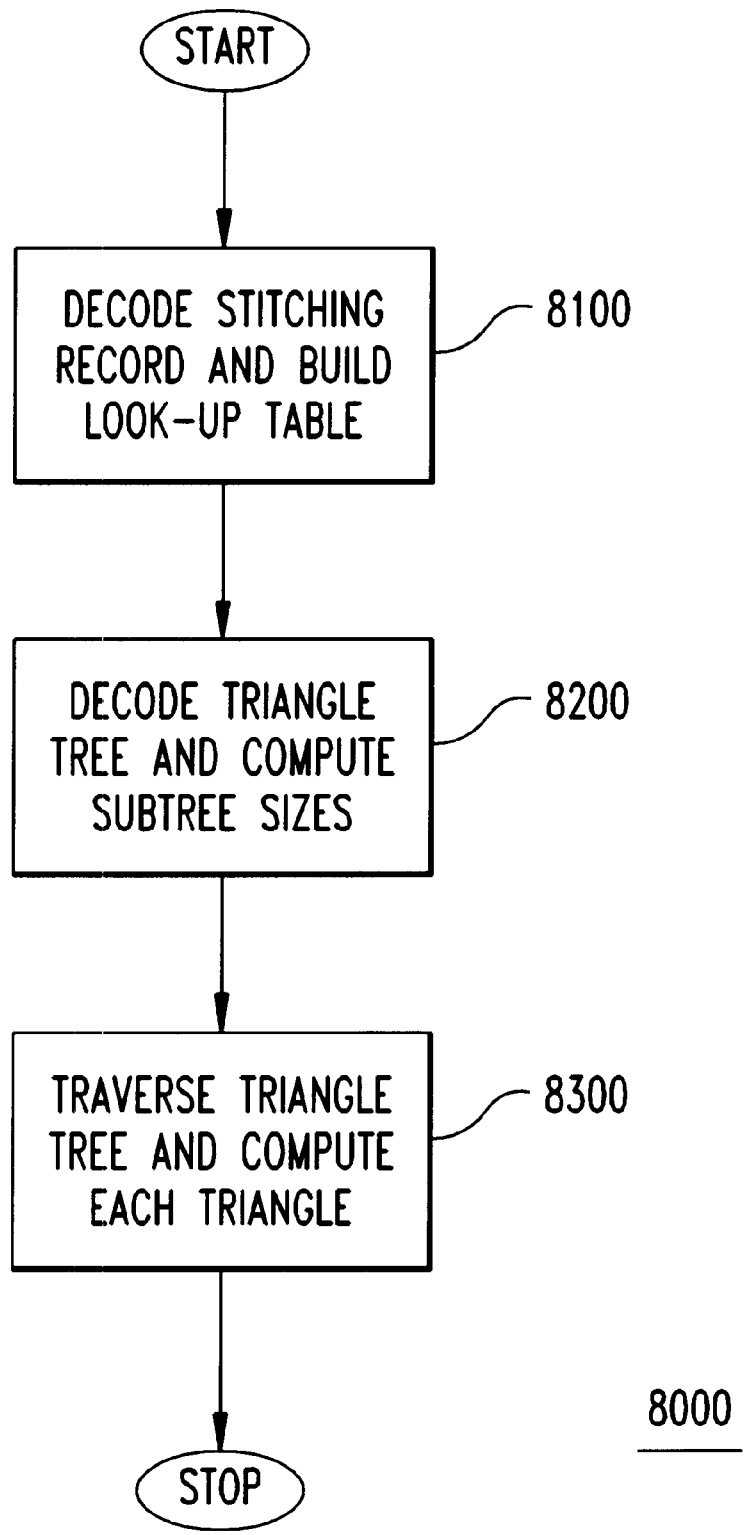
FIG. 8 is a flow chart of a method for reconstruction a polygonal model from data encoded using the data structure of FIG. 6.

FIG. 8 is a flow chart of a method 8000 for reconstructing polygonal models compressed into a data structure 6000 according to the preferred embodiment of the present invention. First, upon receiving the structure record 6100 in step 8100, the stitching record 6110 is decoded and a lookup table is created that establishes a correspondence between vertices of the simple polygon such as is described, for example, in Rossignac et al. or in "SNHC Verification Model V9.0," ISO/IEC JTC/SC29/WG11 M2303, G. Taubin (ed). Then, in step 8200 the triangle tree is decoded from the triangle record and the size of each subtree is computed, e.g. Rossignac et al. or Taubin. Once the first triangle record 6210, 6220, 6230 is received, in step 8300 the decoded triangle tree is traversed and the first received triangle records 6210, 6220, 6230 are decoded. Each triangle subsequently received triangle record 6210, 6220, 6230 is decoded as it is received.

Regarding steps 8100 and 8200, the geometry data is organized according to the traversal order of the vertex tree as described in Rossignac et al. and in Taubin. Once the decoder receives a model's vertex spanning graph, its triangle tree, its entire marching pattern, and at least three geometry samples, the decoder may output the first triangle. Thus, by beginning to output after receiving three geometry samples, latency may be reduced dramatically.

Accordingly, the present invention, organizes the geometry along the triangle tree and interleaving the marching pattern with the geometry data. A decoder receiving data organized according to the present invention, instead of requiring receipt of the entire bitstream before outputting the first triangle as described by Rossignac et al., may output the first triangle may begin output much sooner. Output may begin after the decoder has received the vertex spanning graph, the triangle tree, 3 geometry samples and, optionally, the first bit of the marching pattern. Therefore, the present invention exhibits high compression efficiency with reduced latency.

While the invention has been described in terms of preferred embodiments, those skilled in the art will recognize that the invention can be practiced with modification within the spirit and scope of the appended claims.

We claim:

1. A data structure stored in a memory of a computer system for representing a general n-dimensional polygonal mesh, the data structure comprising:

a structure record containing polygonal model connectivity information, said structure record further including a stitching record defining corresponding polygonal mesh edge pairs and a polygonal tree record representing a polygon tree; and a data record including three or more polygonal records, a corresponding polygon for each said polygonal record being associated with a face of said polygonal model, wherein each of said polygonal records classifies said corresponding polygon as either a leaf polygon, a running polygon or a branching polygon.

2. A data structure as in claim 1, wherein said stitching record includes a vertex tree and a set of jump edges.

3. A data structure as in claim 2, wherein each of said polygonal records are ordered according to traversal order of said polygon tree.

4. A data structure as in claim 3, wherein each of said polygonal records corresponding to a running polygon includes a marching field.

5. A data structure as in claim 3, wherein each of said polygonal records includes a properties field representing properties of said corresponding polygon.

6. A data structure as in claim 5, wherein each of said polygonal properties include color, normals and texture coordinates.

7. A data structure as in claim 3, wherein each of said polygonal records includes a geometry field.

8. A data structure as in claim 3, wherein one or more of said corresponding polygons are triangles.

9. A data structure as in claim 8, wherein each of said corresponding polygons is a triangle.

10. A data structure as in claim 8, each of said polygonal records includes a polygonal field indicating non-triangular polygons.

11. A data structure as in claim 3, wherein said polygonal tree is a rooted triangle tree defines a traversal order starting from a root triangle.

12. A data structure as in claim 3, wherein the structure record is compressed by any one of the following techniques: run-length coding, Huffman coding, Arithmetic coding, Shannon-Fano-Elias coding, or Lempel-Ziv coding.

13. A data structure as in claim 3, wherein the data record are compressed by any one of the following techniques: run-length coding, Huffman coding, Arithmetic coding, Shannon-Fano-Elias coding, or Lempel-Ziv coding.

14. A method of encoding three dimensional shapes comprising the steps of:

a) building a polygon spanning tree for a polygonal mesh representation of a three dimensional shape, said polygonal mesh being a plurality of connected polygons;

b) deriving a set of cut edges for edge of polygons of said polygon spanning tree;

c) constructing a stitching record for said set of cut edges; and d) traversing said polygon spanning tree according to said stitching record and encoding a polygon record for each of said polygons.

15. A method of decoding shapes encoded as in claim 14, said method comprising the steps of:

e) decoding said stitching record and, responsive to said decoded stitching record, building a look-up table;

f) decoding said polygon spanning tree and, responsive to said decoded polygon spanning tree, computing subtree sizes; and g) traversing said polygon spanning tree and decoding each encountered polygon record corresponding to a polygon in said polygon spanning tree.

16. A method of decoding shapes encoded as in claim 15 wherein for each decoded shape, polygons are displayed after decoding a third encountered polygon record.

17. A method of decoding shapes encoded as in claim 16, wherein a plurality of said connected polygons are triangles.

18. A method of decoding shapes encoded as in claim 15, further comprising compressing said polygon spanning tree, said set of cut etches and said stitching record by any one of the following techniques: run-length coding, Huffman coding, Arithmetic coding, Shannon-Fano-Elias coding, or Lempel-Ziv coding.

19. A method of decoding shapes encoded as in claim 15, comprising compressing said encoded polygons by any one of the following techniques: run-length coding, Huffman coding, Arithmetic coding, Shannon-Fano-Elias coding, or Lempel-Ziv coding.

* * * * *